(12) United States Patent
Fontein et al.

(10) Patent No.: US 11,167,621 B2
(45) Date of Patent: Nov. 9, 2021

(54) RETENTION ARRANGEMENT OF A REFRIGERANT COMPRESSOR ON A BODYWORK OF A MOTOR VEHICLE, AND A MOTOR VEHICLE

(71) Applicant: Bayerische Motoren Werke Aktiengesellschaft, Munich (DE)

(72) Inventors: Niko Fontein, Unterschleissheim (DE); Tanja Schuldes, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/294,283

(22) Filed: Mar. 6, 2019

(65) Prior Publication Data

US 2019/0202269 A1     Jul. 4, 2019

Related U.S. Application Data

(63) Continuation of application No. PCT/EP2017/073532, filed on Sep. 19, 2017.

(30) Foreign Application Priority Data

Sep. 26, 2016 (DE) ..................... 10 2016 218 415.6

(51) Int. Cl.
*B60H 1/00* (2006.01)
*B60H 1/32* (2006.01)
(Continued)

(52) U.S. Cl.
CPC ......... *B60H 1/3229* (2013.01); *B60H 1/3223* (2013.01); *B60K 1/04* (2013.01);
(Continued)

(58) Field of Classification Search
CPC .... B60H 1/3229; B60H 1/3226; B60H 1/323; B60K 1/00
(Continued)

(56) References Cited

U.S. PATENT DOCUMENTS 3,449,924 A * 6/1969 Sudmeier ............ F04B 39/1073
                                                      62/227
4,394,818 A   7/1983 Brownfield et al.
(Continued)

FOREIGN PATENT DOCUMENTS

| CN | 204196676 U | 3/2015 |
| CN | 205387063 U | 7/2016 |

(Continued)

OTHER PUBLICATIONS

German-language Search Report issued in counterpart German Application No. 10 2016 218 415.6 dated May 15, 2017 with partial English translation (11 pages).

(Continued)

*Primary Examiner* — Steven M Marsh
(74) *Attorney, Agent, or Firm* — Crowell & Moring LLP

(57) ABSTRACT

A retention arrangement is provided for a refrigerant compressor on a bodywork of a motor vehicle. The compressor is designed to compress a coolant of an air conditioning system. The refrigerant compressor is at least indirectly secured to the bodywork by the retention arrangement wherein the refrigerant compressor is held on the bodywork by a carrier or intermediary support which is itself held on the bodywork and on which at least one electrical component of the motor vehicle is held. The electrical component is different from the refrigerant compressor.

12 Claims, 1 Drawing Sheet

(51) Int. Cl.
*B60K 1/04* (2019.01)
*B60K 25/00* (2006.01)
*F01C 21/00* (2006.01)
*B60R 16/04* (2006.01)
*F04B 53/00* (2006.01)
*B60K 1/00* (2006.01)

(52) U.S. Cl.
CPC .............. *B60K 25/00* (2013.01); *B60R 16/04* (2013.01); *F01C 21/007* (2013.01); *F04B 53/003* (2013.01); *B60H 2001/006* (2013.01); *B60K 1/00* (2013.01); *B60K 2001/0411* (2013.01); *B60K 2025/005* (2013.01)

(58) Field of Classification Search
USPC .............. 248/560, 638; 62/228.1, 228.3, 230
See application file for complete search history.

(56) References Cited

U.S. PATENT DOCUMENTS

| | | | | |
|---|---|---|---|---|
| 5,145,330 | A | * | 9/1992 | Uchiyama ............ B60H 1/3229 248/635 |
| 5,873,429 | A | * | 2/1999 | Qutub .................... B60K 13/04 180/296 |
| 2002/0100290 | A1 | * | 8/2002 | Herta ...................... B60H 1/00 62/434 |
| 2006/0168991 | A1 | * | 8/2006 | Harm ..................... B60H 1/005 62/434 |
| 2009/0152032 | A1 | | 6/2009 | Klotten et al. |
| 2014/0183995 | A1 | | 7/2014 | Saitou et al. |
| 2018/0178624 | A1 | * | 6/2018 | Sakashita ............ B60H 1/3229 |

FOREIGN PATENT DOCUMENTS

| | | |
|---|---|---|
| DE | 32 34 106 A1 | 3/1983 |
| DE | 10 2006 051 383 A1 | 4/2008 |
| DE | 10 2009 015 414 A1 | 9/2010 |
| DE | 11 2012 003 286 T5 | 4/2014 |
| DE | 10 2014 007 693 A1 | 11/2015 |
| EP | 2 402 197 A1 | 1/2012 |
| JP | 2006-188085 A | 7/2006 |

OTHER PUBLICATIONS

International Search Report (PCT/ISA/210) issued in PCT Application No. PCT/EP2017/073532 dated Dec. 21, 2017 with English translation (five (5) pages).

German-language Written Opinion (PCT/ISA/237) issued in PCT Application No. PCT/EP2017/073532 dated Dec. 21, 2017 (five (5) pages).

Chinese Office Action issued in Chinese application No. 201780046971.1 dated Jun. 29, 2021, with English translation (Twelve (12) pages).

* cited by examiner

RETENTION ARRANGEMENT OF A REFRIGERANT COMPRESSOR ON A BODYWORK OF A MOTOR VEHICLE, AND A MOTOR VEHICLE

CROSS REFERENCE TO RELATED APPLICATIONS

This application is a continuation of PCT International Application No. PCT/EP2017/073532, filed Sep. 19, 2017, which claims priority under 35 U.S.C. § 119 from German Patent Application No. 10 2016 218 415.6, filed Sep. 26, 2016, the entire disclosures of which are herein expressly incorporated by reference.

BACKGROUND AND SUMMARY OF THE INVENTION

The invention relates to a retention arrangement of a refrigerant compressor on a bodywork of a motor vehicle, and a motor vehicle having such a retention arrangement.

Retention arrangements of refrigerant compressors on bodyworks of motor vehicles, in particular motor cars, such as, for example, passenger vehicles, are already adequately known from the general prior art and, in particular, from series vehicle construction. The respective refrigerant compressor is in this instance constructed to compress a refrigerant of an air-conditioning system. In this instance, the refrigerant compressor is, for example, a component of such an air-conditioning system by means of which, for example, the interior of the respective motor vehicle can be supplied with cooled air. The air-conditioning system comprises in this instance, for example, a refrigerant circuit, through which the refrigerant can flow and in which the refrigerant compressor is arranged. Consequently, the refrigerant which flows through the refrigerant circuit can be compressed by way of the refrigerant compressor. In the respective retention arrangement, the refrigerant compressor is at least indirectly held on the bodywork, which is also referred to as a body-in-white or shell.

An object of the present invention is to develop a retention arrangement and a motor vehicle of the type mentioned in the introduction in such a manner that a particularly advantageous noise behavior can be achieved.

This object is achieved according to the invention by a retention arrangement and by a motor vehicle in accordance with embodiments of the invention.

A first aspect of the invention relates to a retention arrangement of a refrigerant compressor, which is constructed to compress a refrigerant of an air-conditioning system, on a bodywork of a motor vehicle which is constructed, for example, as a motor car, in particular as a passenger vehicle. In the retention arrangement, the refrigerant compressor is at least indirectly secured to the bodywork and, for example, fixed to the bodywork.

In order to be able to achieve a particularly advantageous noise behavior in a particularly cost-effective manner, the refrigerant compressor is retained on the bodywork by way of a carrier which is retained on the bodywork and on which at least one electrical component of the motor vehicle, which is different from the refrigerant compressor, is retained. That is to say, according to the invention there is provided a carrier which is, for example, a component of the motor vehicle which is constructed separately from the bodywork and which is retained on the bodywork, in particular secured to the bodywork. Consequently, the carrier is a, for example, component of the motor vehicle which is different from the bodywork and which is provided in addition to the bodywork and retained on the bodywork, in particular secured to the bodywork.

There is retained on the carrier at least one electrical component of the motor vehicle which is different from the refrigerant compressor and which is provided in addition to the refrigerant compressor, wherein the electrical component may be constructed as an electronic component. The component is consequently retained on the bodywork via the carrier, that is to say, by means of the carrier. In addition, the refrigerant compressor is also held on the bodywork via the carrier, that is to say, by means of the carrier. Preferably, the refrigerant compressor is retained on the carrier independently of the component. Alternatively or additionally, the component is retained on the carrier independently of the refrigerant compressor. As a result of the securing of the refrigerant compressor on the bodywork according to the invention, a particularly advantageous, decoupled, in particular vibration-decoupled, retention of the refrigerant compressor on the bodywork can be achieved so that excessive structure-borne noise emissions and consequently the production of noises which are undesirable and which, for example, can be perceived in the interior of the motor vehicle by occupants inside the vehicle can be prevented. This can be achieved in this instance in a particularly simple and cost-effective manner since the carrier performs a dual function. On the one hand, the carrier is used to retain the component on the bodywork. On the other hand, the carrier is also used to retain the refrigerant compressor on the bodywork.

It has been found that, as a result of the described retention of the refrigerant compressor via the carrier on the bodywork, an at least two-stage retention of the refrigerant compressor on the bodywork and in particular a two-stage decoupling, in particular a two-stage vibration decoupling, of the refrigerant compressor from the bodywork (which is also described as a body-in-white or a shell) can be achieved. That is to say, a decoupling, in particular a vibration decoupling, of the refrigerant compressor from the bodywork can be carried out on two levels. In the context of this two-stage decoupling, the carrier is used as an intermediate mass, on which the refrigerant compressor is retained, for example, in a decoupled manner. The intermediate mass formed by the carrier in turn is retained on the bodywork, in particular in a decoupled manner. It is thereby possible, for example, to prevent vibration excitations of the bodywork brought about by the refrigerant compressor, in particular during the operation thereof, and consequently excessive structure-borne noise emissions so that the production of unpleasant noises which can be perceived inside the motor vehicle can be prevented. It is thereby possible to provide a particularly high level of travel comfort for passengers inside the vehicle.

As a result of the use of the carrier both for retaining the refrigerant compressor and for retaining the component, the use of replacement structures with additional weights can be prevented so that the number of components, the costs and the weight of the motor vehicle can be kept particularly low. Furthermore, it is possible to use the retention arrangement according to the invention both for motor vehicles with a front-wheel or four-wheel drive and for motor vehicles with a purely rear drive or rear-wheel drive RWD, without replacement structures with additional weights having to be used for this purpose. That is to say, the retention arrangement according to the invention can be used in a simple and cost-effective manner for different configurations of the motor vehicle, wherein the configurations differ from each other, for example, with regard to their respective drive concept. With a first configuration, the motor vehicle has, for example, a front-wheel drive (FWD) or, however, a four-wheel drive or all-wheel drive (4WD or AWD). In the second configuration, the motor vehicle has a purely rear-wheel drive or rear drive (RWD). For both configurations, the retention arrangement according to the invention can be used without weight-intensive and cost-intensive modifications so that the different configurations can be provided in a weight-effective and cost-effective manner.

The use of the retention member for retaining the refrigerant compressor and for retaining the component on the bodywork may further be advantageous in that vibrations, which are excessive as a result of the component which is connected to the carrier and which are brought about by the refrigerant compressor, in particular as a result of the operation thereof, can be prevented by the carrier or the vibrations thereof being able, for example, to be damped by means of the component which is acting as a mass.

In an advantageous embodiment of the invention, the refrigerant compressor is constructed as an electrical refrigerant compressor, whereby a particularly advantageous retention can be achieved.

In order to achieve a retention of the refrigerant compressor on the bodywork in a manner which is particularly advantageous in technical vibration terms, in another embodiment of the invention there is provision for the component to be constructed as an energy store for storing electrical energy. In this instance, the component is in particular constructed as an electrochemical energy store, in particular as a battery, wherein there is preferably provision for the component to be constructed as a 12 volt battery. In this instance, the battery has, for example, an operating voltage of 12 volt or 48 volt. A particularly advantageous noise behavior can thereby be achieved so that excessive vibrations can be prevented in a particularly effective manner.

Furthermore, it has been found to be particularly advantageous for the component to be constructed as an electronic calculation device, which is also referred to as a control device. It is further contemplated for the component to be constructed as an electronic charging system. Excessive excitations and structure-borne noise emissions can also thereby be prevented.

Another embodiment is distinguished in that the carrier is retained on the bodywork in a vibration-decoupled manner. An excessive transmission of vibrations from the carrier to the bodywork can thereby be prevented so that excessive vibration excitation of the bodywork and consequently excessive structure-borne noise emissions can be prevented.

Alternatively or additionally, there is provision for the refrigerant compressor to be retained on the carrier in a vibration-decoupled manner. It is thereby already possible to prevent excessive vibrations of the carrier since a transmission of vibrations from the refrigerant compressor to the carrier can be kept particularly low.

In order to produce a particularly advantageous retention of the carrier on the bodywork which is at least substantially vibration-decoupled, in another embodiment of the invention there is provision for the carrier to be supported on the bodywork by way of at least one resiliently deformable element. The resiliently deformable element is, for example, formed from a resiliently deformable material, in particular from an elastomer material or rubber, wherein there is preferably provision for the element to touch, on the one hand, the bodywork and, on the other hand, the carrier.

In another particularly advantageous embodiment of the invention, the refrigerant compressor is supported on the carrier by at least one resiliently deformable element, wherein the statements in relation to the first element are transferred to the second element and vice versa. Consequently, for example, the refrigerant compressor is supported on the carrier by way of a deformable material, in particular rubber, or via an elastomer material, so that a transmission of vibrations from the refrigerant compressor to the carrier can be kept particularly low.

Finally, it has been found to be particularly advantageous for the refrigerant compressor to be arranged in a front-end region of the bodywork. It is thereby possible, for example, to keep tubing and losses to a low level. The tubing comprises, for example, a line through which the refrigerant can flow. By means of the line, the refrigerant is guided, for example, to the compressor or discharged from the refrigerant compressor.

A second aspect of the invention relates to a motor vehicle having at least one retention arrangement according to the invention. Advantages and advantageous embodiments of the first aspect of the invention are intended to be considered to be advantages and advantageous embodiments of the second aspect of the invention and vice versa.

Other objects, advantages and novel features of the present invention will become apparent from the following detailed description of one or more preferred embodiments when considered in conjunction with the accompanying drawings.

BRIEF DESCRIPTION OF THE DRAWINGS

In the figures, elements which are identical or have the same function are given the same reference numerals.

DETAILED DESCRIPTION OF THE DRAWINGS

Figure 1:
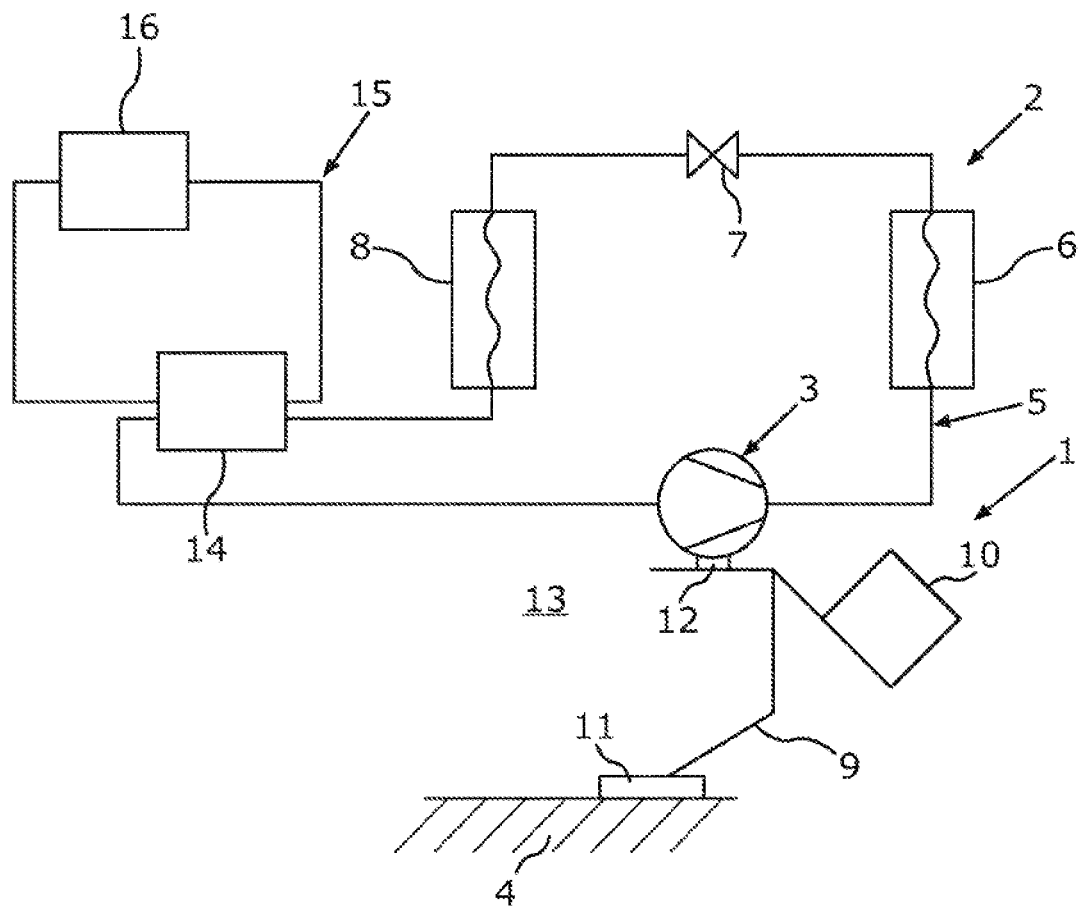
FIG. 1 is a schematic illustration of a retention arrangement of a refrigerant compressor, which is constructed to compress a refrigerant of an air-conditioning system, on a bodywork of a motor vehicle, in which the refrigerant compressor is held on the bodywork using a carrier on which at least one electrical component of the motor vehicle, which is different from the refrigerant compressor, is also held.
Figure 2:
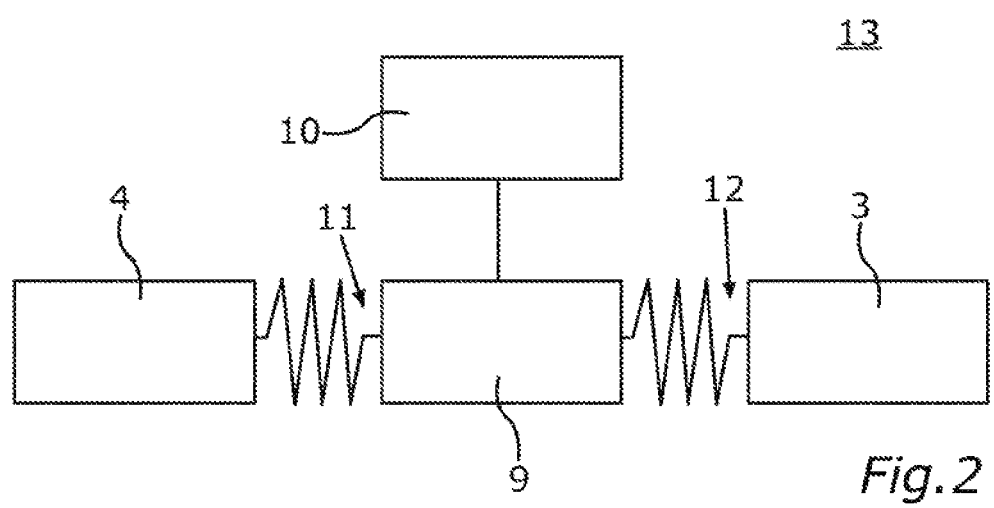
FIG. 2 is another schematic illustration of the retention arrangement.

FIGS. 1 and 2 schematically show a retention arrangement, which is generally designated 1, of a refrigerant compressor 3 constructed for compressing a refrigerant of an air-conditioning system 2 of a motor vehicle. The air conditioning system 2 is illustrated in a particularly schematic manner in the Figures on a bodywork 4, which bodywork is illustrated as a cutout and in a particularly schematic manner in the Figures. The motor vehicle is constructed, for example, as a motor car, in particular as a passenger vehicle. The air-conditioning system 2 has a refrigerant circuit 5 through which the refrigerant can flow and in which the refrigerant compressor 3, which is also referred to as a compressor or condenser unit, is arranged. The air-conditioning system 2 further includes at least one condenser 6 which is arranged in the refrigerant circuit 5 downstream of the refrigerant compressor 3 for condensing the refrigerant. By means of the refrigerant compressor 3, the refrigerant flowing through the refrigerant circuit 5 is compressed and conveyed to the condenser 6 via which the refrigerant is condensed. An expansion element 7 of the air-conditioning system 2 which is constructed, for example, as an expansion valve, is arranged downstream of the condenser 6 in the refrigerant circuit 5, wherein the refrigerant is expanded by way of the expansion element 7.

In the flow direction of the refrigerant through the refrigerant circuit 5, an evaporator 8 of the air-conditioning system 2 is arranged downstream of the expansion element 7 and upstream of the refrigerant compressor 3 in the refrigerant circuit 5, wherein the refrigerant is evaporated by way of the evaporator 8. As a result of the evaporation of the refrigerant, the refrigerant can absorb heat from air which flows around the evaporator 8. The air flowing around the evaporator 8 is thereby cooled as a result of a heat transfer from the air, via the evaporator 8, to the refrigerant. The cooled air is, for example, supplied to the interior space of the motor vehicle, whereby the interior space can be cooled. That is to say, the air-conditioning system 2 is used to supply the interior space with cooled air, wherein the air is cooled by means of the air-conditioning system 2.

The motor vehicle is constructed, for example, as a hybrid vehicle or, in particular, preferably as an electric vehicle. In this instance, the motor vehicle has at least one electric machine which is not illustrated in the Figures and which can be operated, for example, in an engine operating mode as an electric motor. In the engine operating mode thereof, the electric machine provides torques by means of which at least one wheel of the motor vehicle, in particular the motor vehicle as a whole, can be electrically driven. In order to operate the electric machine in the engine operating mode, the electric machine is supplied with electrical energy or electric current. To this end, the motor vehicle includes at least one energy store which is, for example, constructed as an electrochemical energy store. The energy store is preferably constructed as a high-voltage component and consequently has an electric voltage, in particular an electric operating voltage, of more than 50 volts, in particular of more than 60 volts. In particular, the electrical operating voltage of the high-voltage component is several hundred volts in order to thereby be able to produce particularly high electric power levels in order to drive the motor vehicle. The energy store is preferably constructed as a high-voltage battery (HV battery). In the engine operating mode, the electric machine is, for example, supplied with electrical energy stored in the energy store. Consequently, the motor vehicle is, for example, constructed as a battery electric vehicle (BEV).

Preferably, the refrigerant compressor 3 is constructed as an electrical refrigerant compressor, that is to say, as an electrically operable refrigerant compressor. This means that the refrigerant compressor 3 cannot be (or cannot only be) driven mechanically by means of a drive component which is different from the refrigerant compressor 3, such as, for example, an internal combustion engine of the motor vehicle, but instead the refrigerant compressor 3 can be operated or driven electrically. To this end, the refrigerant compressor 3 has, for example, at least one compression element (which cannot be seen in the Figures) for conveying and compressing the refrigerant. Furthermore, the refrigerant compressor 3 has at least one electric motor, by which the compression element can be driven. In order to operate the electric motor and consequently in order to drive the compression element by way of the electric motor, the electric motor is supplied with electrical energy.

Furthermore, in this instance in the refrigerant circuit 5 there is arranged a cooling device which is referred to as a chiller 14. The chiller 14 is also arranged in a refrigerant circuit 15 through which a cooling medium can flow. The cooling medium is a cooling fluid, in particular a cooling liquid, which can flow through the cooling circuit 15 and consequently through the chiller 14. The refrigerant and the cooling medium can consequently flow through the chiller 14. Via the chiller 14 there is produced, for example, a heat exchange between the refrigerant and the cooling medium. In the context of this heat exchange, there is produced, for example, a heat transfer from the cooling medium to the refrigerant, whereby the cooling medium is cooled.

Furthermore, there is arranged in the cooling circuit 15 a component 16 which is different from the refrigerant compressor 3 and which is, for example, the component 10 or a component which is different from the component 10. The component 16 is in particular an electrical component, wherein the component 16 is, for example, a high-voltage component (HV component) and in this instance has an electrical voltage, in particular an electrical operating voltage, of more than 50 volts, in particular of more than 100 volts. In particular, the component 16 may be constructed as the previously mentioned energy store or HV store.

FIG. 1 shows that the cooling medium can flow through the component 16 so that a heat exchange between the cooling medium and the component 16 can be carried out. Since—as described above—the cooling medium is cooled, a heat transfer from the component 16 to the cooling medium flowing through the component 16 can be carried out, whereby the component 16 is cooled. Consequently, using the chiller 14, an effective cooling of the component 16 can be carried out.

In order to be able to produce a particularly advantageous noise behavior of the motor vehicle, the refrigerant compressor 3 is retained on the bodywork 4 using a carrier 9 secured on the bodywork 4. On the carrier 9, at least one electrical component 10 of the motor vehicle, which is different from the refrigerant compressor 3, is retained. That is to say, the carrier 9 is different from the bodywork 4 and is provided in addition to the bodywork 4. And, the carrier 9 is different from the refrigerant compressor 3 and is provided in addition to the refrigerant compressor 3. And, the electrical component 10 is different from the refrigerant compressor 3 and from the bodywork 4 and is provided in addition to the refrigerant compressor 3 and the bodywork 4. The carrier 9 is retained on the bodywork 4 and, for example, secured to the bodywork 4. The electrical component 10 is retained on the carrier 9 and consequently retained, in particular secured, via the carrier 9 on the bodywork 4. Furthermore, the refrigerant compressor 3 is also retained on the carrier 9 and consequently retained, in particular secured, on the bodywork 4 by means of the carrier 9. The carrier 9 is thus used to retain both the refrigerant compressor 3 and the component 10, which is different from the refrigerant compressor 3 and which is provided in addition to the refrigerant compressor 3, on the bodywork 4. A decoupling, in particular vibration decoupling, of the refrigerant compressor 3 from the bodywork 4 can thereby be achieved on two levels or two stages. The carrier 9 is an intermediate mass on which the refrigerant compressor 3 is retained in a preferably decoupled manner or in a vibration-decoupled manner.

The intermediate mass (carrier 9) is in turn retained, preferably in a decoupled manner or vibration-decoupled manner, on the bodywork 4 which is also referred to as a body-in-white or shell. As a result of this, in particular at least substantially decoupled, retention of the refrigerant compressor 3 on the bodywork 4, excessive structure-borne noise emissions and consequently undesirable noises which can be perceived inside the motor vehicle by passengers in the interior space can be prevented so that a particularly high level of comfort can be achieved.

The component 10 is, for example, an additional energy store which is constructed, for example, as an electrochemical energy store, in particular as a battery. In this instance, the component 10 is, for example, constructed as a low-voltage component (LV component) whose electrical voltage, in particular electrical operating voltage, is less than 50 volts. The electrical operating voltage of the component 10 is, for example, 12 volts, so that the component 10 is constructed, for example, as a 12 volt battery. Alternatively, it is contemplated for the component 10 to be constructed as an electronic calculation device, that is to say, as a control device of the motor vehicle. In particular, it is possible for the component 10 to be constructed as an electronic component so that the component 10 is also referred to as an E/E component.

In order to produce a particularly advantageous decoupling, in particular vibration decoupling, there is preferably provision for the carrier 9 to be retained in an at least substantially vibration-decoupled manner on the bodywork 4. To this end, there is, for example, provided at least one resiliently deformable element 11 which is formed, for example, from a resiliently deformable material. The resiliently deformable material is preferably a rubber or an elastomer material, wherein the element 11 is supported, on the one hand, on the bodywork 4 and, on the other hand, on the carrier 9. Preferably, the element 11 contacts, on the one hand, the bodywork 4 and, on the other hand, the carrier 9 directly. Using the element 11, the carrier 9 is supported on the bodywork 4. If there are, for example, vibrations of the carrier 9 and resultant relative movements between the carrier 9 and the bodywork 4, the element 11 is resiliently deformed. Vibration energy is thereby converted into deformation energy, whereby the vibrations of the carrier 9 are damped. Excessive transmission of vibrations from the carrier 9 to the bodywork 4 can thereby be prevented.

Alternatively or additionally, there is provision for the refrigerant compressor 3 to be retained on the carrier 9 in an at least substantially vibration-decoupled manner. To this end, there is preferably provided at least one resiliently deformable element 12, by which the refrigerant compressor 3 is supported on the carrier 9.

Preferably, the element 12 is formed from a resiliently deformable material, in particular from a rubber or an elastomer material. If, for example, vibrations of the refrigerant compressor 3 consequently occur, resulting in relative movements between the refrigerant compressor 3 and the carrier 9, the element 12 is resiliently deformed by means of these relative movements. Vibration energy is thereby converted into deformation energy so that the vibrations of the refrigerant compressor 3 can be damped by means of the element 12. Excessive transmission of vibrations from the refrigerant compressor 3 to the carrier 9 can thereby be prevented so that on the whole an excitation of the bodywork 4 and consequently excessive structure-borne noise emissions can be prevented.

Preferably, the refrigerant compressor 3 is arranged in a front-end region 13 of the bodywork 4 so that, for example, tubing and losses can be kept to a low level. The component 10, in particular the mass thereof, is used in the retention arrangement 1, for example, as a decoupling mass in order to damp vibrations of the carrier 9 or the refrigerant compressor 3 connected to the carrier 9 or to keep them at a low level so that excessive transmission of vibrations from the refrigerant compressor 3 to the bodywork 4 can be prevented.

LIST OF REFERENCE NUMERALS

1 Retention arrangement
2 Air-conditioning system
3 Refrigerant compressor
4 Bodywork
5 Refrigerant circuit
6 Condenser
7 Expansion element
8 Evaporator
9 Carrier
10 Component
11 Element
12 Element
13 Front-end region
14 Chiller
15 Cooling circuit
16 Component The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A retention arrangement of a refrigerant compressor of a motor vehicle, comprising:
   a bodywork of the motor vehicle;
   a carrier, wherein the carrier and the bodywork are separate structures and wherein the carrier is retained on the bodywork;
   at least one electrical component of the motor vehicle retained on the carrier, wherein
   the refrigerant compressor is retained on the carrier, and
   the at least one electrical component of the motor vehicle is different from the refrigerant compressor.

2. The retention arrangement as claimed in claim 1, wherein
   the refrigerant compressor is an electrical refrigerant compressor.

3. The retention arrangement as claimed in claim 2, wherein
   the at least one electrical component is an energy store for storing electrical energy.

4. The retention arrangement as claimed in claim 1, wherein
   the at least one electrical component is an electronic calculation device.

5. The retention arrangement as claimed in claim 1, wherein
   the carrier is retained on the bodywork in a vibration-decoupled manner.

6. The retention arrangement as claimed in claim 5, wherein
   the refrigerant compressor is retained on the carrier in a vibration-decoupled manner.

7. The retention arrangement as claimed in claim 1, wherein
   the refrigerant compressor is retained on the carrier in a vibration-decoupled manner.

8. The retention arrangement as claimed in claim 1, further comprising:
   at least one resiliently deformable element by which the carrier is supported on the bodywork.

9. The retention arrangement as claimed in claim 8, further comprising:

at least one further resiliently deformable element by which the refrigerant compressor is supported on the carrier.

10. The retention arrangement as claimed in claim 1, further comprising:
at least one resiliently deformable element by which the refrigerant compressor is supported on the carrier.

11. The retention arrangement as claimed in claim 1, wherein
the refrigerant compressor is arranged in a front-end region of the bodywork.

12. A motor vehicle, comprising at least one retention arrangement as claimed in claim 1.

* * * * *